United States Patent
Stevens

(10) Patent No.: US 9,712,230 B1
(45) Date of Patent: Jul. 18, 2017

(54) DIRECTIONAL STATISTICAL PRIORITY MULTIPLE ACCESS SYSTEM AND RELATED METHOD

(71) Applicant: Rockwell Collins, Inc., Cedar Rapids, IA (US)

(72) Inventor: James A. Stevens, Lucas, TX (US)

(73) Assignee: Rockwell Collins, Inc., Cedar Rapids, IA (US)

(*) Notice: Subject to any disclaimer, the term of this patent is extended or adjusted under 35 U.S.C. 154(b) by 409 days.

(21) Appl. No.: 14/488,420

(22) Filed: Sep. 17, 2014

(51) Int. Cl.
*H04B 7/00* (2006.01)
*H04B 7/14* (2006.01)
*H04B 7/26* (2006.01)
*H01Q 3/24* (2006.01)

(52) U.S. Cl.
CPC ............... *H04B 7/26* (2013.01); *H01Q 3/24* (2013.01); *H04B 7/2643* (2013.01)

(58) Field of Classification Search
USPC ............ 342/58, 367, 370; 455/15, 452.1
See application file for complete search history.

(56) References Cited

U.S. PATENT DOCUMENTS

| | | | |
|---|---|---|---|
| 7,388,540 B1* | 6/2008 | Zogg | H04B 17/27 342/367 |
| 2002/0086708 A1* | 7/2002 | Teo | H04L 27/2602 455/561 |
| 2003/0100343 A1* | 5/2003 | Zourntos | H04W 52/241 455/562.1 |

* cited by examiner

*Primary Examiner* — Dao Phan
(74) *Attorney, Agent, or Firm* — Angel N. Gerdzhikov; Donna P. Suchy; Daniel M. Barbieri

(57) ABSTRACT

The present invention is directed to a system and related method for providing high bandwidth communication between nodes in an RF neighborhood. Each node may transmit via an omnidirectional antenna element while time differentially receiving via a directional antenna element. As each node receives signals from neighborhood nodes, it determines a neighborhood contingent as well as a desirability of the received signals and the direction from which the desirable signals originate. Based on this direction, each node focuses a directional antenna element on the node from which a signal is desired while eliminating interference from transmissions from undesired nodes. Based on the neighborhood contingent, the system adjusts the node's omnidirectional transmit rates to communicate via statistical priority multiple access protocols with the desirable neighborhood nodes. The system adjusts the node's statistical priority multiple access channel access to account for the eliminated interference.

20 Claims, 7 Drawing Sheets

DIRECTIONAL STATISTICAL PRIORITY MULTIPLE ACCESS SYSTEM AND RELATED METHOD

FIELD OF THE INVENTION

The present invention relates generally to radio frequency (RF) communication techniques between a plurality of nodes in a neighborhood. More particularly, embodiments of the present invention relate to a system and related method for statistical priority-based multiple access communication using an omnidirectional transmission and a directional reception enabling a throughput not limited by a number of nodes in the neighborhood.

BACKGROUND

Media Access Control (MAC) may enable multiple access for a plurality of nodes to the content within a single node. Several multiple access techniques perform the MAC task to a certain degree. However, each of the current access techniques maintains limitations to throughput as node number increases.

Random access techniques to the single node may employ a "transmit as required" technique such as Random Aloha where throughput greatly decreases with an increasing number of transmitting nodes. A time division access technique such as Time division multiple access (TDMA) may allow multiple users access to a common frequency divided into time slots. A Carrier Sense Multiple Access (CSMA) technique may allow multiple users access to a common node through node verification of open time before transmission.

A Statistical Priority-Based Multiple Access (SPMA) technique may employ an omnidirectional transmitter to transmit a shared signal to a plurality of users. This contingent based statistical protocol may employ a spectrum allocation to enable multiple users' access to the limited spectrum. Instead of being contingent on one channel with multiple packets at a time, SPMA may employ multiple channels using multiple pulses of the same packet of information sent across the multiple channels. These multiple pulses may then be received and processed enabling greater throughput of the signal and message reception.

With traditional SPMA, one technique may employ a receiver continuously staring at each channel associated with a transmitter pseudo randomly alternating across the channels. During transmission, the receiver is blinked allowing send and receive across each of the channels. Received packets are processed to create the message from packets arriving via any of the channels.

As node numbers increase, SPMA may sense the activity in the channel and requires node transmission reduction or "back off" to maintain the channel loading below a given interference level. This technique may allow multiple receiver node access to the common node providing per node throughput that may scale as T/N, where T is the SPMA channel capacity and N is number of nodes in the network. As indicated, with increasing number of nodes N, the per-node throughput decreases proportional to 1/N. Further, the total network throughput may be limited and may scale as T.

Each of these access protocols may allow users multiple access to a common node. However, each of these access protocols is limited in node throughput by the number of nodes requesting access. As a finite level of channel occupancy is exceeded, each of these techniques may either reduce available bandwidth or catastrophically fail.

In the physical layer, many traditional systems employ omnidirectional transmitters associated with omnidirectional receivers to maintain communication between nodes. In this situation, a transmitter node may economically offer its content to the plurality of receive nodes (e.g., transmit 1 receive n) via transmission at one time and receive simultaneously at a different time from n other nodes. As these time differences are small, the transmission and reception may appear to be simultaneous to a user. As small as this time difference may be, the break in receive capability during transmission still remains. Each node within range may require some portion of time to transmit and receive lowering the total throughput of the network. In addition, each of these systems may require 10 parallel receive modems providing a network processing throughput limited to approximately 20 megabits per second (mbps).

Traditional directional transmit and receive systems may require either two frequencies and antennas per link (one transmit, one receive) or one frequency and one antenna per link (TDMA Half duplex). These traditional systems may require two expensive antennas and apertures dedicated to each link and a high latency value. These traditional systems maintain a throughput directly dependent on the number of nodes in the neighborhood and the traffic patterns therein.

Therefore a need remains for a system and related method offering priority based multiple access to omnidirectionally transmit while directionally receiving offering a total network throughput capacity which scales based on the number of nodes in a narrow receive field of view.

SUMMARY

Accordingly, a communications system for radio frequency data transfer may include an omnidirectional antenna element associated with a first node. The omnidirectional antenna element may include an omnidirectional radio frequency transmitter. The first node may also include a directional antenna element having a field of view. Associated with the first node, a controller may be operably coupled with each of the directional antenna element and the omnidirectional antenna element for operational control of each element. The first node may also include a memory and an input output device operably coupled with the controller. The input output device may act to generate data for the first node.

The memory may include a non-transitory computer readable program code embodied therein for a statistical priority multiple access channel access protocol. These code instructions may be executable by the controller causing the controller to receive a first signal via the directional antenna element and store content information from the first signal to the memory. Once the content information is stored, the controller may determine a neighborhood contingent based on the content information. The controller may then determine an azimuth and elevation to an origin of the first signal from either the content information or a receiving vector of the first signal.

If the controller determines the origin of the first signal is a desired neighborhood node, it directs the directional antenna element to the azimuth and elevation of the received signal. This direction may limit receipt of radio frequency energy originating outside the field of view of the directional antenna element. In one embodiment, the directing includes narrowing the field of view of the directional antenna element. Then the controller transmits a second signal via the omnidirectional antenna element to all nodes within range. This directional reception and omnidirectional transmission may act to operably connect the first node with the desired neighborhood node enabling radio frequency data transfer via the statistical priority multiple access channel access protocol between the first node and the desired neighborhood node, the operable connection enables a neighborhood throughput based on the number of nodes in the field of view of the directional antenna element.

An additional embodiment of the inventive concepts disclosed herein may include a system wherein the directional antenna element further includes a passive electronically scanned array antenna, an active electronically scanned array antenna, a meta material antenna, an electromechanical steered antenna, a parasitic directional antenna, and a mechanically steered antenna.

An additional embodiment of the inventive concepts disclosed herein may include a system wherein the controller is further configured for adjusting a transmit rate of one of the first signal and the second signal based on the neighborhood contingent.

An additional embodiment of the inventive concepts disclosed herein may include a system wherein the content information is a position of the second node and a bearing to the second node and the controller determines an azimuth and elevation to the origin of the first signal absolutely to a reference system, relatively to a forward bearing of a node platform forward end, and relatively to a reference within the directional antenna element.

An additional embodiment of the inventive concepts disclosed herein may include a system wherein the first node decreases transmission throughput via the second signal based on the neighborhood contingent.

An additional embodiment of the inventive concepts disclosed herein may include a system wherein the omnidirectional antenna element and the directional antenna element are within a multiple element antenna, the multiple element antenna further configured for directional reception of the first signal and directional transmission of the second signal.

An additional embodiment of the inventive concepts disclosed herein may include a system wherein the input output device operably coupled with the controller is a Tactical Targeting Network Transceiver, a Multi-functional Information Distribution System Joint Tactical Radio System, and a radio configured to communicate via a Tactical Targeting Network Transceiver waveform.

An additional embodiment of the inventive concepts disclosed herein may include a system wherein the first signal and the second signal are conformal to a Tactical Targeting Network Technology waveform, a waveform operating statistical priority multiple access channel access protocol, and a Link 16 waveform.

An additional embodiment of the inventive concepts disclosed herein may include a system wherein narrowing the field of view of the directional antenna element further comprises narrowing the field of view to focus on a single desired neighborhood node, the narrowing including a directional transmitter focusing on a single receiver and a directional receiver focusing on a single transmitter.

An additional embodiment of the inventive concepts disclosed herein may include a system wherein the first node and the desired neighborhood node are associated with a ship, an aircraft, a submarine, a surface vehicle, a deployable facility, a fixed site facility, and a handheld transceiver.

An additional embodiment of the inventive concepts disclosed herein may include a method for radio frequency data transfer. The method may include associating a directional antenna element and an omnidirectional antenna element within a first node, each of the elements operably coupled with and operably controlled by a controller.

Preferably, a memory stores non-transitory computer readable program code embodied therein for a statistical priority multiple access channel access protocol, the computer readable program code comprising instructions which, when executed by the controller, include receiving a data input via an input output device operably coupled with the controller. The instruction may further include receiving a first signal via the directional antenna element and storing content information from the first signal within the memory.

The method may determine a neighborhood contingent based on either the content information or from the direction of reception. The method may determine an azimuth and elevation to an origin of the first signal and whether the origin of the first signal is a desired neighborhood node. If so, the controller may direct the directional antenna element to the azimuth and elevation, the directing to limit a first node receipt of radio frequency energy originating outside the field of view of the directional antenna element.

Here, the directing may include narrowing the field of view of the directional antenna element and transmitting a second signal via the omnidirectional antenna element.

The method may then operably connect the first node with the desired neighborhood node enabling radio frequency data transfer via the statistical priority multiple access channel access protocol. This operable connection may enable a neighborhood throughput based on the number of nodes in the field of view of the directional antenna element.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Figure 1:
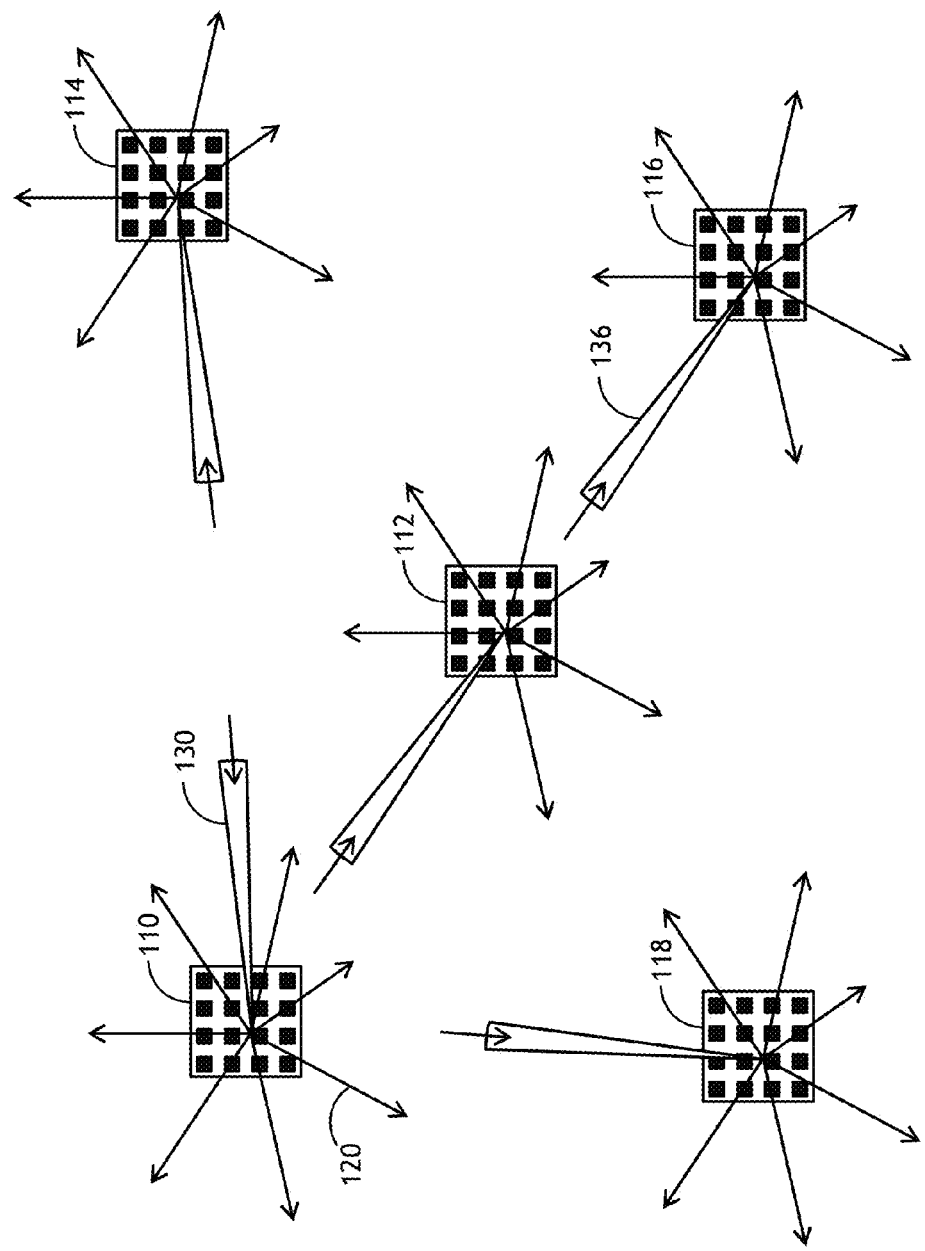
FIG. 1 is a diagram of a plurality of exemplary nodes operating one embodiment of the present invention.

Reference will now be made in detail to the presently preferred embodiments of the inventive concepts disclosed herein, examples of which are illustrated in the accompanying drawings. The following description presents certain specific embodiments of the present invention. However, the present invention may be embodied in a multitude of different ways as defined and covered by the claims. In this description, reference is made to the drawings wherein like parts are designated with like numerals throughout.

Embodiments of the inventive concepts disclosed herein are directed to a system and related method for providing high bandwidth communication between nodes in an RF neighborhood. Each node may transmit via an omnidirectional antenna element while time differentially receiving via a directional antenna element. As each node receives signals from neighborhood nodes, it determines a neighborhood contingent as well as a desirability of the received signals and the direction from which the desirable signals originate. Based on this direction, each node focuses a directional antenna element on the node from which a signal is desired while eliminating interference from transmissions from undesired nodes. Based on the neighborhood contingent, the system adjusts the node's omnidirectional transmit rates to communicate via statistical priority multiple access protocols with the desirable neighborhood nodes. The system adjusts the node's statistical priority multiple access channel access to account for the eliminated interference. Time differential directional reception and omnidirectional transmission allows a high bandwidth flow of data unlimited by a number of nodes in the neighborhood.

In one embodiment, a Tactical Targeting Networking Technology (TINT) system may be implemented with the inventive concepts disclosed herein to enable tactical information sharing between entities on a battlefield. Timely disclosure of targeting information may assist a friendly entity in mission accomplishment. Increased bandwidth may offer each node in the neighborhood an increase in speed with which data is transferred between the nodes.

Reference Chart

| Ref. No. | Description |
|---|---|
| 100 | Neighborhood |
| 110 | Node |
| 112 | Node |
| 114 | Node |
| 116 | Node |
| 118 | Node |
| 120 | Omnidirectional Transmission |
| 130 | Directional Field of View |
| 132 | Second Field of View |
| 136 | Narrow Field of View |
| 200 | Directional Antenna system |
| 210 | Controller |
| 212 | Transmitter |
| 214 | Receiver |
| 216 | Bearing Module |
| 218 | Node Position Module |
| 220 | Memory |
| 230 | Input/Output |
| 232 | Data source |
| 234 | Data source |
| 250 | Omnidirectional Antenna Element |
| 252 | Directional Antenna Element |
| 310 | Parallel Modems |
| 314 | Transceiver |
| 320 | Omnidirectional Reception |
| 330 | Directional Transmit |
| 350 | Multiple Element Antenna |
| 416 | Wide Beamwidth |
| 700 | Method Flow |
| 702 | Receive First Signal |
| 704 | Determine Neighborhood Contingent |

-continued

Reference Chart

| Ref. No. | Description |
|---|---|
| 706 | Azimuth and Elevation |
| 708 | Desired Node Query |
| 710 | Directing Directional Antenna Element |
| 712 | Directionally Receive |
| 714 | Omnidirectionally Transmit |
| 716 | Radio Frequency Data Communication |
| 722 | First Signal Content Information |
| 730 | Data Input |

Referring to FIG. 1, a diagram of a plurality of exemplary nodes operating one embodiment of the present invention concepts disclosed herein is shown. Each node 110, 112, 114, 116, 118 in a neighborhood 100 may desire continuous communication with each of the other nodes in the neighborhood 100. Embodiments of the inventive concepts disclosed herein may offer a directional receive capability concurrently with an omnidirectional transmit capability to each of the nodes enabling high bandwidth communication within the neighborhood 100. Here, node 110 may transmit to all nodes via an omnidirectional transmission 120 while directionally receiving only from node 114 via a directional field of view 130. Each node 110 may further adapt the directional transmissions to SPMA channel access. In embodiments, systems herein may command a transmitter to increase its offered SPMA duty factor beyond what is possible with omni-directional receivers since the directionally receiving receivers have a smaller field of view and are thus not subject to interference from nodes outside the smaller field of view.

The throughput S of embodiments of the inventive concepts disclosed herein may scale proportional to 1/R where R is a number of nodes in the individual node's receive field of view. For example, the node 110 may have a single node 114 in its directional field of view 130 so an R value for the node 110 may be one. Based on similar geometry, the node 116 may have two nodes 112 and 110 within its directional field of view 136 resulting in an R value for the node 116 of two.

Figure 2:
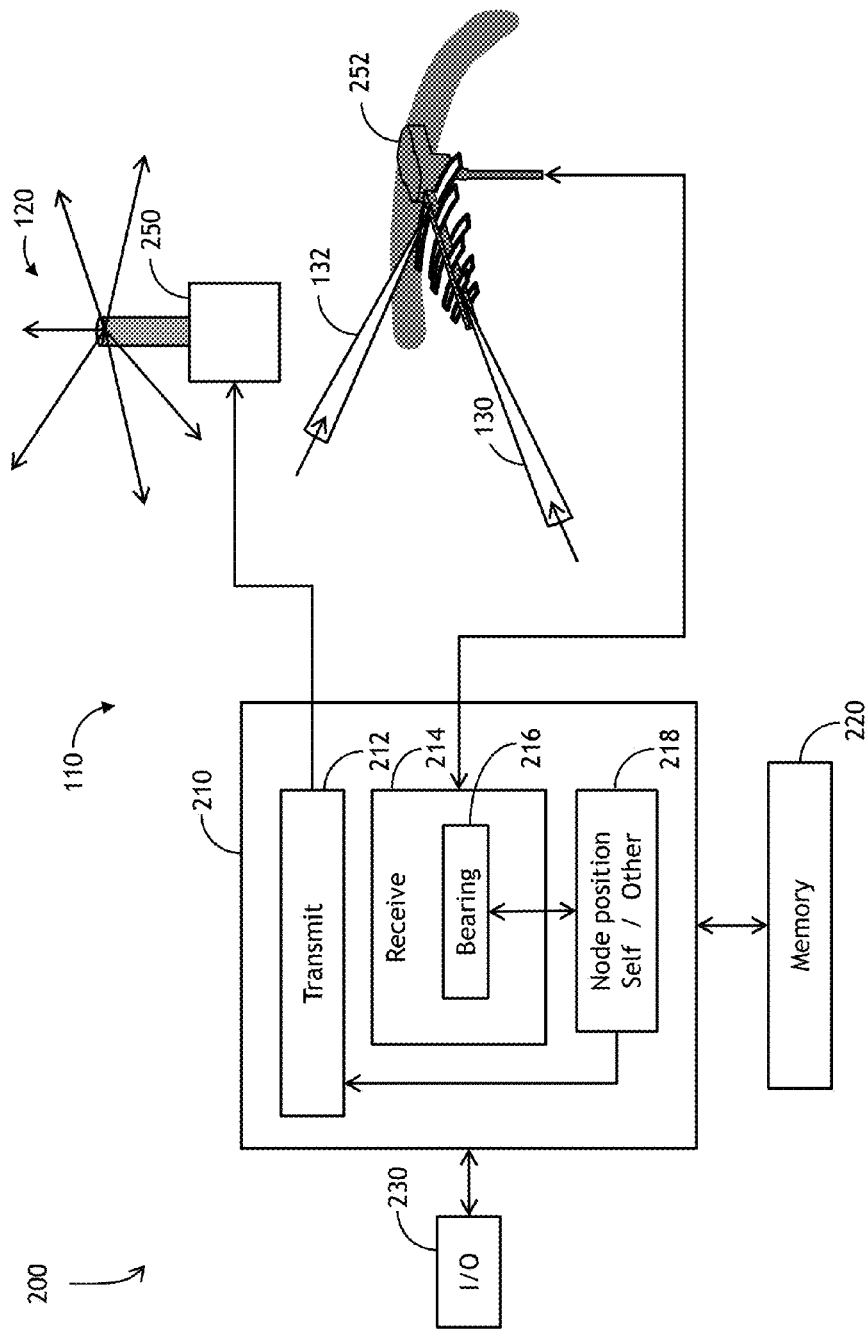
FIG. 2 is a diagram of a system for directional SPMA exemplary of the inventive concepts disclosed herein.

Referring to FIG. 2, a diagram of a system for directional SPMA exemplary of the inventive concepts disclosed herein is shown. The system 200 may include and exemplary node 110 having a controller 210, input output device 230, an omnidirectional antenna element 250, and a directional receive antenna element 252. The omnidirectional antenna element 250 is configured to provide an omnidirectional transmit capability for the system 200 and the directional receive antenna element 252 is configured to provide a directional receive capability for the system 200. The directional field of view 130 may indicate the limited field of view of signal reception for the directional receive antenna element 252. In some embodiments, the directional receive antenna element 252 may include one or more directional antenna elements. The elements may include one or more rotational physical apertures, phased array elements, a parasitic directional type antenna, and Electrically Scanned Array (ESA) antennal elements employing beam steering techniques.

The controller 210 may provide to the system 200 control of each element of the system 200 including a transmitter 212 and a receiver 214 including a bearing element 216. As each node generates its own position, each node may transmit a self-position to each node within range. Similarly, as each node receives the feedback signal including position information of the other nodes in the neighborhood, the system 200 may narrow the directional field of view 130 for the node 110 by positioning the directional receive antenna element 252 to receive as few signals as possible.

As nodes may transmit via the omnidirectional antennas and receive via their directional antennas, one desired directional receive aperture may preferably include a receive field of view of a single node. Assuming a number of nodes in a neighborhood is N, and a number of nodes in the individual node's receive field of view is R, as the directional field of view 130 narrows, R decreases from n nodes in the neighborhood to one. Each node may then adjust their SPMA offered traffic rate region (S), based upon R, rather than N as in traditional systems. In this manner, as R decreases toward one (directional field of view 130 narrows), S increases.

A memory 220 may operate to store information required by the controller 210 to carry out the tasks of the system 200. For example, the memory 220 may receive and store position and bearing information from the plurality of nodes in the neighborhood as well as preamble information associated with each node within the neighborhood.

An omnidirectional transmission 120 may include data. In some embodiments, the omnidirectional transmission 120 may include a limited amount of data to enable an efficient connection between nodes. In one embodiment, the omnidirectional transmission 120 may be limited to node position information and a preamble. In this manner, nodes may receive a limited amount of data via the omnidirectional transmission and delay a body of transmission until after the system 200 establishes directional communication.

Preferably, the system 200 may narrow the directional field of view 130 to allow only signals from a desired one node to be received. The system 200 may attempt to reach the goal of a single other node within the directional field of view 130 of the directional receive antenna element 252 as a single node within the directional field of view 130 decreases N to one and increases S.

The input output device 230 may enable the system 200 to receive inputs from a user as well as provide a user with the signals received by the system 200. Input output device 230 may include a data generation device 232 as well as a data reception device 234. For example, a data generation device 232 may include a keyboard input device or a touchscreen device while data reception device may include an exemplary display device. In one embodiment, the input output device 230 may include a tactical radio enabling information sharing between the user and a remote user operating a distant node within the neighborhood.

In additional embodiments, the directional receive antenna element 252 may operate to directionally receive a signal from a plurality of nodes maintaining multiple apertures including a first directional field of view 130 to a first node and a second directional field of view 132 to a second node via a multiple aperture array. In this manner, the system 200 may command the directional receive antenna element 252 to add another node from which the node 110 may receive increasing N to two in situations where communication is desired to more than one node. In this manner, system 200 may enable the node 110 to simultaneously communicate with multiple different nodes from multiple different directions at once.

Figure 3:
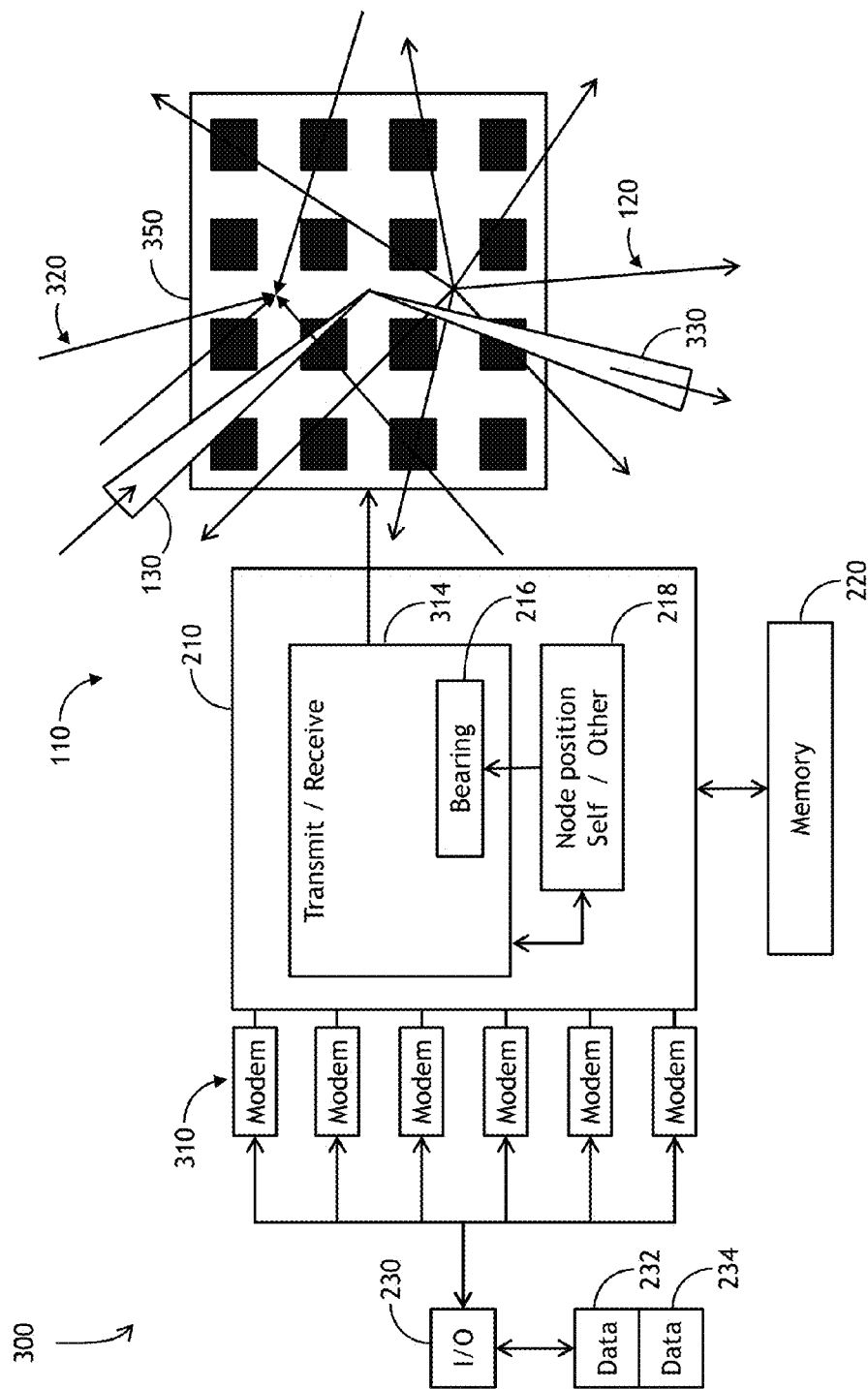
FIG. 3 is a diagram of a multiple element antenna for directional SPMA exemplary of one embodiment of the present invention.

Referring to FIG. 3, a diagram of a multiple element antenna for directional SPMA exemplary of one embodiment of the present invention is shown. A system 300 may operate employing a multiple element antenna 350 configured to function both as an omnidirectional antenna element and as a directional antenna element. In one embodiment, the multiple element antenna 350 may omnidirectionally transmit and receive.

In some embodiments, the multiple element antenna 350 may transmit via an omnidirectional transmission 120 and receive via a directional reception technique within a directional field of view 130. In some embodiments, the multiple element antenna 350 may transmit directionally 330 and receive omnidirectionally 320. In some embodiments, the multiple element antenna 350 may transmit directionally 330 and receive directionally. Reduction of size weight and power requirements may aid the system 300 in application.

In employing the multiple element antenna 350, the system 300 may use a transmitter receiver 314 under the direction of a controller 210. As in the system 200, the system 300 may operate to offer high throughput communication between a node 110 and additional nodes in the neighborhood. As used herein, system 300 may describe one embodiment of a node configured for directional SPMA. Similarly, system 200 may describe another embodiment of a node configured for directional SPMA. The systems 200 and 300 may differ slightly in hardware concerning antenna type and transmitter receiver infrastructure, however the concept or directional receive and omnidirectional transmit may operate similarly in both.

Preferably, the system 300 may include an omnidirectional antenna 250 plus a directional aperture antenna as the multiple element antenna 350. In one embodiment, the directional aperture antenna may be an ESA antenna with a large number of elements able to produce a sufficiently narrow beamwidth. In one embodiment, the ESA has 1000 or more antenna elements to sufficiently narrow the beamwidth in narrow field of view 136. The system 300 may also employ a staring receiver for each ESA element. In embodiments, the memory 220 may receive across a wide band of spectrum and store the last n microseconds of memory of each of the in-phase I and quadrature Q of the samples multiplied by the bandwidth of the spectrum including sub-bands. The memory 220 stores a limited amount of received data multiplied by the bandwidth of receive information multiplied by the number of ESA elements. The system 300 may employ N number of parallel modems 310 to enable network processing limited only by N.

The controller 210 accesses the memory 220 in near real time processing to determine a match between packets of received data to rebuild the message. This level of associative processing may allow the system 300 to post-receive process to 1) rebuild the received message and 2) determine the bearing from which the signal originated. System 300 may store multiple receptions in memory running parallel modems 310 and determine the bearing entirely at the receiver requiring no exchange of azimuth information over the air.

In additional embodiments, the system 300 applied to multiple receivers communicating with multiple transmitters may benefit. The system 300 may allow increased receiver processing availability since the transmitter transmits omnidirectionally and the processing required by the receiver is limited by the narrow field of view 136. In addition, a system including multiple nodes communicating with a single node via the system 300 directional receivers may realize the increased network throughput S based on the system 300 increased receiver processing capability and availability.

Figure 4:
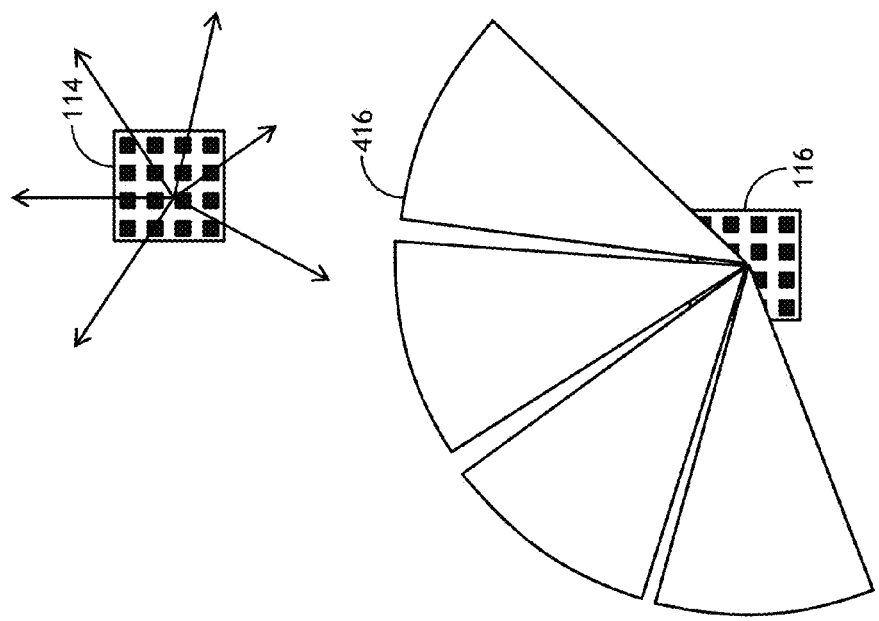
FIG. 4 is a diagram of one step in a method for directional SPMA exemplary of the inventive concepts disclosed herein.
Figure 4:
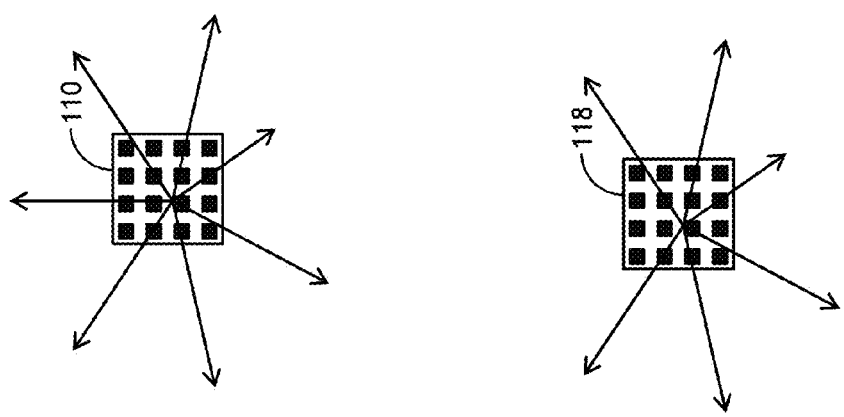

Referring to FIG. 4, a diagram of one step in a method for directional SPMA exemplary of the inventive concepts disclosed herein is shown. FIG. 4 indicates an initial receive status 400 of the nodes within the neighborhood. Each of the nodes may, at one point, maintain an initial receive status 400 to determine from which node it may desire directed receive communication. Here, an exemplary node 116 is shown in the initial receive status 400 listening for neighborhood nodes with which the node 116 may communicate. The node 116 maintains reception of signals from neighborhood nodes 110, 114, 118 via a wide beamwidth 416 receive pattern. In embodiments, this wide beamwidth 416 may include a rotational antenna element as well as subset of a phased array element. Once the node 116 determines a precise bearing information for each of the other nodes in the neighborhood, the system 300 may operate to maintain a narrow beam directed toward the desired node for reception of the single signal from the desired node.

In some embodiments, system 300 may determine a neighborhood contingent based on a number of nodes in a neighborhood and their traffic patterns. For example, a first neighborhood contingent may include and exemplary six nodes wherein three of the nodes indicate a capability of directional transmission and the remaining three nodes indicate only a capability of omnidirectional transmission and reception. System 300 node 110 may determine this neighborhood contingent based on the signals received at the receivers 214 and 314 (e.g. combination of signals entering the receive antennas.)

In some embodiments, the system 300 may direct the narrow field of view 136 receive antenna toward the desired node without reception of position information from the desired node. With an omnidirectional receive capability, the system 300 may continuously receive signals and store information from all in-range nodes within a 360 degree azimuth. Based on the bearing of the received signal, the system 300 may post process to decrease the width of the reception beamwidth to eventually and sufficiently narrow the beamwidth to focus on the desired node. In this manner, the system 300 may reduce the amount of processing required from 360 degrees to, for example, initially 12 segments of 30 degrees each, then 12 segments of 2.5 degrees each, and so on until the system 300 reaches a desired beamwidth to eliminate signals from undesirable nodes.

System 300 may determine azimuth and elevation either absolutely to a specific reference systems, such as an Earth Coordinate System, or relatively such as to relative to platform forward end. Alternatively, this relative bearing may be relative to antenna hardware, e.g. relative to antenna sector x (where x may be one of multiple antenna sectors).

In addition to a 360° azimuth coverage for initial receive status 400, the system 300 may also listen within 360 degrees of elevation to directionally sense the bearing, in azimuth and elevation, of the desired node. In some embodiments, each node may preferably continuously transmit to ensure other nodes maintain an accurate count of the number of nodes in the neighborhood as well as precise position/bearing information to each of the neighboring nodes. Additionally, nodes may transmit to synchronize and share position information among the nodes within the neighborhood enabling each node to maintain awareness of each other node in the neighborhood.

In one embodiment, the system 300 may periodically transmit a beacon to each node in the neighborhood to determine a number of neighboring nodes as well as an updated bearing solution to each desirable node. In embodiments, the system 300 may allow each node in the neighborhood to increase the S of the SPMA since directional receipt of signals may allow elimination of the non-desired node signals. In this manner, the system 300 may effectively scale S based on the number of nodes in the field of view R.

Figure 5:
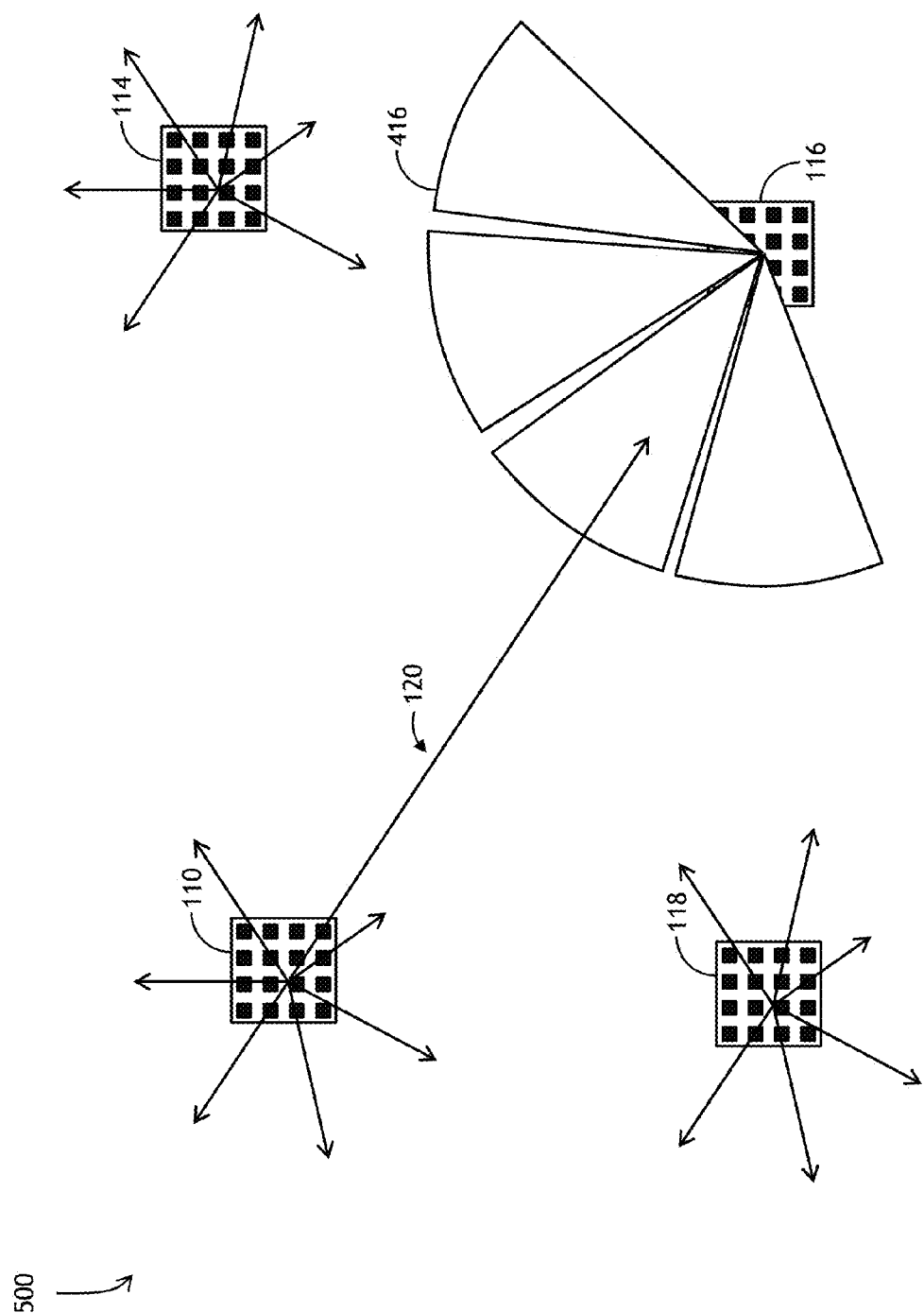
FIG. 5 is an diagram of an additional step in a method for directional SPMA exemplary of one embodiment of the present invention.

Referring to FIG. 5, a diagram of an additional step in a method for directional SPMA exemplary of one embodiment of the present invention is shown. As node 116 listens for available nodes via a wide beamwidth 416, the system 300 may determine a desired node for reception of a signal. Here, the node 110 may send its own position and preamble via the omnidirectional transmission 120 to all nodes within range. Here, the node 116 may desire signal reception from the node 110 and may receive and store in the memory 220 the position information of the node 110. As above, this omnidirectional transmission 120 may also include a preamble for available nodes to receive and store within the memory 220.

Figure 6:
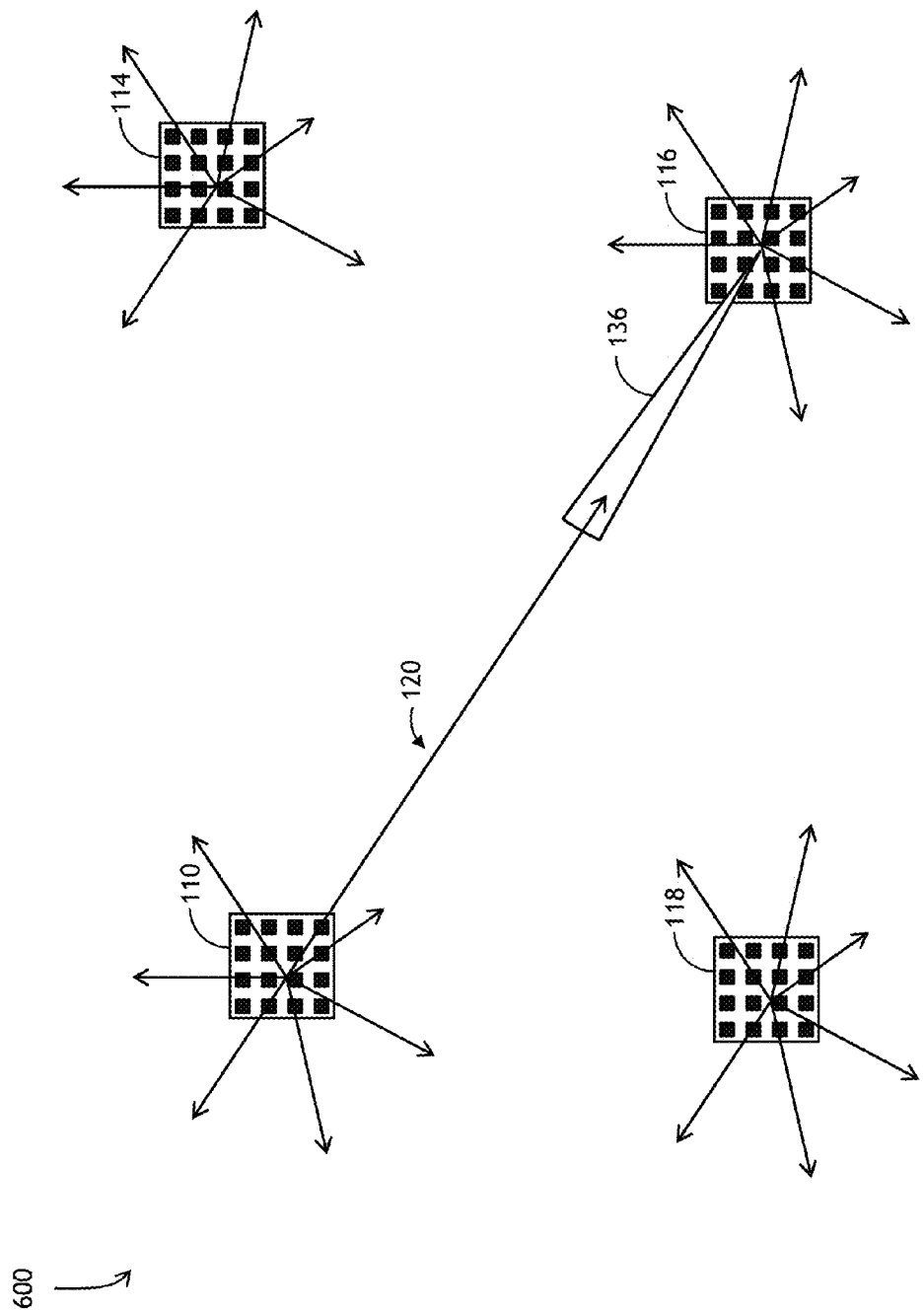
FIG. 6 is a diagram of an additional step in a method for directional SPMA exemplary of the inventive concepts disclosed herein.

Referring to FIG. 6, a diagram of an additional step in a method for directional SPMA exemplary of the inventive concepts disclosed herein is shown. Once a node receiver 116 receives a synchronizing signal via wide beamwidth 416, the system 300 may process the received signal to narrow the size of the wide beamwidth to reduce interference from undesired nodes.

In one embodiment, the system 200 may direct the rotational antenna element 252 toward the desired node enabling the receiving node to inhibit signals transmitted from non-desired nodes. In additional embodiments, the system 300 may direct the multiple element antenna 350 to include more antenna elements and transition to a directionally receive status 500 using a narrow field of view 136 to limit the reception to the desired single node. As indicated, the beamwidth of narrow field of view 136 may eliminate the node 116 reception of signals from neighborhood nodes outside the narrow field of view 136 (here, exemplary undesired nodes 114 and 118).

In embodiments, the system 300 may receive a preamble while in the initial receive status 400 and store the received data within the memory 220. As the system 300 transitions from the initial receive status 400 to directionally receive status 600, the system 300 may retrieve the stored preamble from memory for post-receive processing and faster connection to the desired node.

In one embodiment, the system 300 may provide a control channel upon which the system 300 may build a communications channel between the nodes 110 and 116. In embodiments, the system 300 may operate to establish a low latency control channel for additional systems to use for additional types of communications. For example, a system using directional transmit and directional receive may benefit from embodiments of the system 300 by quickly establishing the bearing from each node to each other node to begin the traffic channel via directional network communications. The system 300 may enhance control of each channel causing a direct reduction in processing required to determine a bearing to the desirable node.

In embodiments, the system 300 may operate in association with non-directionally enhanced nodes to increase the overall throughput of the neighborhood. As more nodes configured with embodiments of the system 300 are added to the neighborhood, desired throughput of the network as a whole may increase. As the system 300 maintains compatibility with existing SPMA networking assets, each of the disclosed systems herein may function within existing SPMA networks. In some embodiments, the system 300 may transmit via the omnidirectional antenna elements 250 and 350, and continue to receive via the directional apertures 252 and 350 to enhance reliability and performance of current SPMA network assets.

In embodiments, the system 300 may receive from each node in the neighborhood a feedback signal self-describing the node. As each node 110 may receive this signal, the system 300 stores in the memory 220 and maintains awareness of which of the nodes in the neighborhood are directionally capable and which are omnidirectional only. Each of the nodes configured with the system 300 may adjust value when transmitting to an omnidirectional to not overwhelm the omnidirectional only nodes. In this manner, nodes configured with the system 300 may offer a network increased range and greater data rates as compared to a network without incorporation of the system 300 nodes.

The system 300 may also operate to prevent jamming from a hostile threat. Directional receive capabilities of the system 300 may operate to enhance an anti-jam performance of the operational node 110 through elimination of all signals outside the narrow field of view 136 of the node 116. In this manner, the system 300 may eliminate possible jamming signals emanating from areas outside the narrow field of view 136. The system 300 with an incorporated ESA may operate with a Low Probability of Detection (LPD) and Low Probability of Intercept (LPI) since the directional limitations of the receive antenna (an optionally the directional limitations of the transmit antenna) provide a limited narrow field of view 136 within which a potential interceptor must be physically present.

Figure 7:
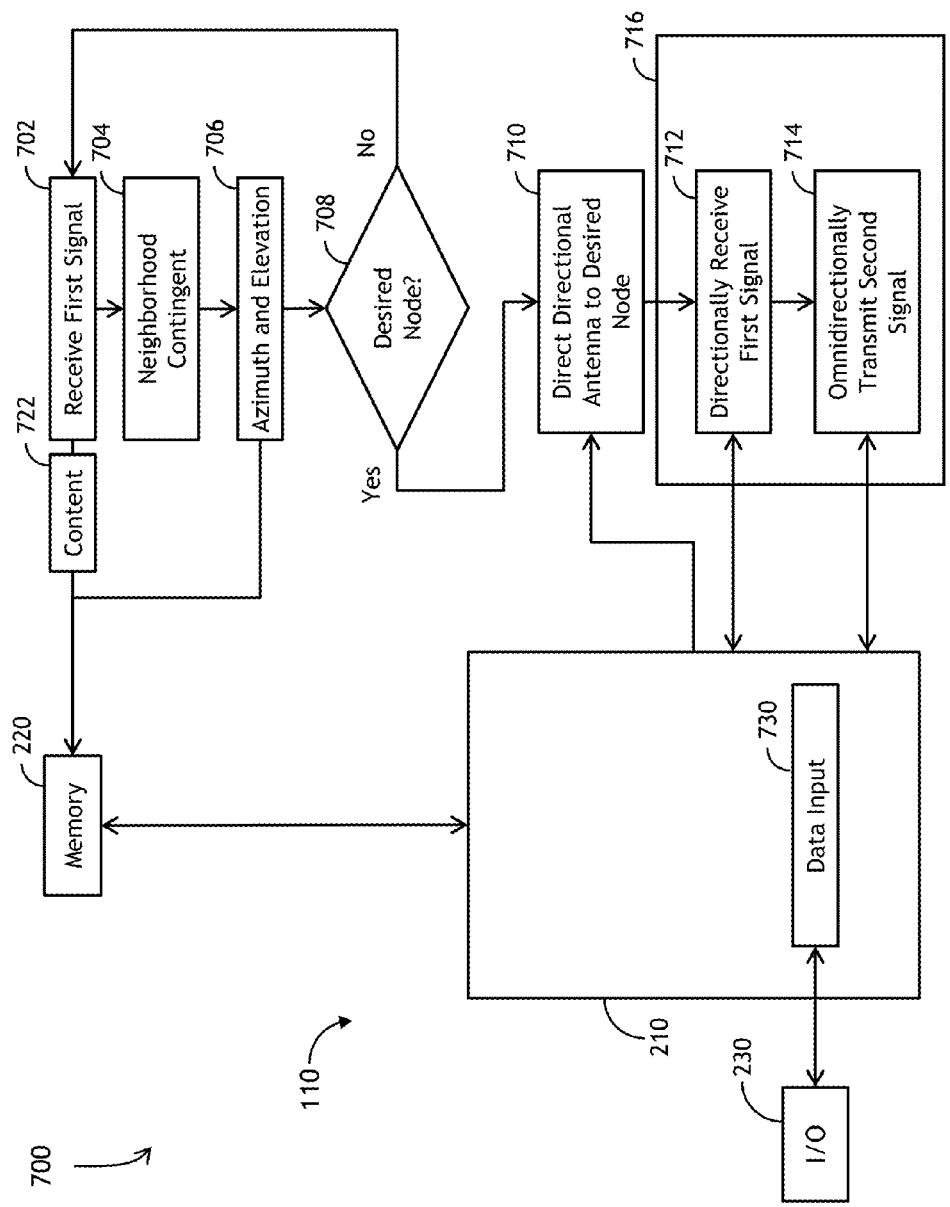
FIG. 7 is a flow diagram of a method for directional SPMA exemplary of one embodiment of the present invention.

Referring to FIG. 7, a flow diagram of a method for directional SPMA exemplary of one embodiment of the present invention is shown. The method 700 may include associating a directional antenna element and an omnidirectional antenna element within a first node 110, each of the directional antenna element and the omnidirectional antenna element operably coupled with and operably controlled by a controller, the controller having non-transitory computer readable program code embodied therein for a statistical priority multiple access channel access protocol. A step 730 may include receiving a data input via an input output device operably coupled with the controller, the input output device including a data generation device and data reception device, and a step 702 may include receiving a first signal via the directional antenna element, the directional antenna element having a field of view. A step 722 may include storing content information from the first signal within a memory 220 operably coupled with the controller. A step 704 may include determining a neighborhood contingent based at least on the content information. A step 706 may include determining, from at least one of: the content information and from a receiving vector of the first signal, an azimuth and elevation to an origin of the first signal.

A step 708 may include querying if the first signal is received from at least one desired neighborhood node. If the answer is no, the method 700 returns to step 702 to continue to listen for an additional first signal. If the answer to the query in step 708 is yes, a step 710 may include directing a directional antenna element toward the azimuth and elevation of the at least one desired node. In this manner, the method 700 may limit the first node receipt of radio frequency energy originating outside the field of view of the directional antenna element, the directing including narrowing the field of view of the directional antenna element. Steps 712 and 714 may include directionally receiving and omnidirectionally transmitting via the statistical priority multiple access channel access protocol the first and second signals respectively to enable RF data communication at a step 716, between the first node and the at least one desired neighborhood node providing a neighborhood throughput based on the number of nodes in the field of view of the directional antenna element.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A communications system for radio frequency data transfer, comprising:
    an omnidirectional antenna element associated with a first node, the omnidirectional antenna element including an omnidirectional radio frequency transmitter;
    a directional antenna element associated with the first node, the directional antenna element having a field of view;
    a controller operably coupled with each of the directional antenna element and the omnidirectional antenna element for operational control of each of the omnidirectional antenna element and the directional antenna element;
    a memory operably coupled with the controller;
    an input output device operably coupled with the controller, the input output device including a data generation device and data reception device;
    the memory storing non-transitory computer readable program code for a statistical priority multiple access channel access protocol, the computer readable program code comprising instructions for causing the controller to:
        receive a first signal via the directional antenna element;

store content information from the first signal to the memory;
determine a neighborhood contingent based at least on the content information;
determine, from at least one of: the content information and a receiving vector of the first signal, an azimuth and elevation to an origin of the first signal;
determine, from the content information, if the origin of the first signal is at least one desired neighborhood node;
direct the directional antenna element to the azimuth and elevation if the origin of the first signal is the at least one desired neighborhood node so as to limit a first node receipt of radio frequency energy originating outside the field of view of the directional antenna element, the directing including narrowing the field of view of the directional antenna element;
transmit a second signal via the omnidirectional antenna element, the second signal based on a data generation;
operably connect the first node with the at least one desired neighborhood node via the first signal and the second signal to enable radio frequency data transfer via the statistical priority multiple access channel access protocol between the first node and the at least one desired neighborhood node so as to enable a neighborhood throughput based on the number of nodes in the field of view of the directional antenna element.

2. The system of claim 1, wherein the directional antenna element further comprises at least one of: a passive electronically scanned array antenna, an active electronically scanned array antenna, a meta material antenna, an electromechanical steered antenna, a parasitic directional antenna, and a mechanically steered antenna.

3. The system of claim 1, wherein the memory further stores instructions for causing the controller to adjust a transmit rate of one of the first signal and the second signal based on the neighborhood contingent.

4. The system of claim 1, wherein the content information is one of: a position of the second node and a bearing to the second node and the controller determines an azimuth and elevation to the origin of the first signal one of: absolutely to at least one reference system, relatively to a forward bearing of a node platform forward end, and relatively to a reference within the directional antenna element.

5. The system of claim 1, wherein the memory further stores instructions for causing the controller to adjust transmission throughput via the second signal based on the neighborhood contingent.

6. The system of claim 1, wherein the omnidirectional antenna element and the directional antenna element are within a multiple element antenna, the multiple element antenna further configured for directional reception of the first signal and directional transmission of the second signal.

7. The system of claim 1, wherein the input output device operably coupled with the controller is at least one of: a Tactical Targeting Network Transceiver, a Multi-functional Information Distribution System Joint Tactical Radio System, and a radio configured to communicate via a Tactical Targeting Network Transceiver waveform.

8. The system of claim 1, wherein the first signal and the second signal are conformal to one of: a Tactical Targeting Network Technology waveform, a waveform operating statistical priority multiple access channel access protocol, and a Link 16 waveform.

9. The system of claim 1, wherein narrowing the field of view of the directional antenna element further comprises narrowing the field of view to focus on a single desired neighborhood node, the narrowing including at least one of: a directional transmitter focusing on a single receiver and a directional receiver focusing on a single transmitter.

10. The system of claim 1, wherein the first node and the at least one desired neighborhood node are associated with one of: a ship, an aircraft, a submarine, a surface vehicle, a deployable facility, a fixed site facility, and a handheld transceiver.

11. A method for radio frequency data transfer, comprising:
associating a directional antenna element and an omnidirectional antenna element within a first node, each of the directional antenna element and the omnidirectional antenna element operably coupled with a controller, the omnidirectional antenna element being an omnidirectional radio frequency transmitter, the controller having non-transitory computer readable program code embodied therein for a statistical priority multiple access channel access protocol, the computer readable program code comprising instructions which, when executed by the controller, cause the controller to:
receive a data input via an input output device operably coupled with the controller, the input output device including a data generation device and a data reception device;
receive a first signal via the directional antenna element, the directional antenna element having a field of view;
store content information from the first signal within a memory operably coupled with the controller;
determine a neighborhood contingent based at least on the content information;
determine, from at least one of: the content information and a receiving vector of the first signal, an azimuth and elevation to an origin of the first signal;
determine, from the content information, if the origin of the first signal is at least one desired neighborhood node;
direct the directional antenna element to the azimuth and elevation if the origin of the first signal is the at least one desired neighborhood node so as to limit a first node receipt of radio frequency energy originating outside the field of view of the directional antenna element, the directing including narrowing the field of view of the directional antenna element;
transmit a second signal via the omnidirectional antenna element, the second signal based on the data generation;
operably connect the first node with the at least one desired neighborhood node via the first signal and the second signal to enable radio frequency data transfer via the statistical priority multiple access channel access protocol between the first node and the at least one desired neighborhood node so as to enable a neighborhood throughput based on the number of nodes in the field of view of the directional antenna element.

12. The method of claim 11, wherein associating a directional antenna element and an omnidirectional antenna element within the first node further comprises associating at least one of: a passive electronically scanned array antenna, an active electronically scanned array antenna, a meta material antenna, an electromechanical steered antenna, a parasitic directional antenna, and a mechanically steered antenna.

13. The method of claim 11, wherein the memory further stores instructions for causing the controller to adjust a transmit rate of at least one of the first signal and the second signal based on the neighborhood contingent.

14. The method of claim 11, wherein determining the azimuth and elevation to an origin of the first signal is based on at least one of: a position of the at least one desired neighborhood node and a bearing to the at least one desired neighborhood node, and the determining the azimuth and elevation to the origin of the first signal is one of: absolutely to at least one earth reference system, relatively to a forward bearing of a node platform forward end, and relatively to a reference within the directional antenna element.

15. The method of claim 11, wherein the memory further stores instructions for causing the controller to adjust transmission throughput via the second signal based on the neighborhood contingent.

16. The method of claim 11, wherein operably connecting the first node with the at least one desired neighborhood node via the first signal and the second signal further comprises operably connecting the first node via the omni-directional antenna element and the directional antenna element within a multiple element antenna, the multiple element antenna further configured for one of: directional reception of the first signal, directional transmission of the first signal, direction reception of the second signal, and directional transmission of the second signal.

17. The method of claim 11, wherein receiving a data input via the input output device operably coupled with the controller further includes receiving data from at least one of: a Tactical Targeting Network Transceiver, a Multi-functional Information Distribution System Joint Tactical Radio System, and a radio configured to communicate via a Tactical Targeting Network Transceiver waveform.

18. The method of claim 11, wherein receiving the first signal and transmitting the second signal are conformal to one of: a Tactical Targeting Network Technology waveform, a waveform operating statistical priority multiple access channel access protocol, and a Link 16 waveform.

19. The method of claim 11, wherein narrowing the field of view of the directional antenna element further comprises narrowing the field of view to focus on a single desired neighborhood node, the narrowing including at least one of: a directional transmitter focusing on a single receiver and a directional receiver focusing on a single transmitter.

20. The method of claim 11, wherein the first node and the at least one desired neighborhood node are associated with one of: a ship, an aircraft, a submarine, a surface vehicle, a deployable facility, a fixed site facility, and a handheld transceiver.

* * * * *